United States Patent
Matthews et al.

[15] 3,701,536
[45] Oct. 31, 1972

[54] LABYRINTH SEAL

[72] Inventors: Jennifer V. Matthews, Phoenix; Thomas T. Hamrick, Scottsdale, both of Ariz.

[73] Assignee: The Garret Corporation, Los Angeles, Calif.

[22] Filed: May 19, 1970

[21] Appl. No.: 38,657

Related U.S. Application Data

[63] Continuation of Ser. No. 689,574, Dec. 11, 1967, abandoned.

[52] U.S. Cl. ............... 277/56, 117/105.2, 277/235 A, 415/174
[51] Int. Cl. .................................................. F02f 11/00
[58] Field of Search ......... 117/105.2; 277/53, 55, 56, 277/57, 96, 235 A, 237; 415/174

[56] References Cited

UNITED STATES PATENTS

| | | | |
|---|---|---|---|
| 3,413,136 | 11/1968 | Emanuelson et al | 117/105.2 X |
| 3,127,668 | 4/1964 | Troy | 29/419 X |
| 3,519,282 | 7/1970 | Davis | 277/53 X |
| 2,904,449 | 9/1959 | Bradstreet | 117/105.2 X |
| 2,781,210 | 2/1957 | Wood | 277/56 |
| 2,930,521 | 3/1960 | Koehring | 277/237 X |
| 3,018,085 | 1/1962 | Welsh | 415/174 |
| 3,042,365 | 7/1962 | Curtis et al. | 415/174 |
| 3,053,694 | 9/1962 | Daunt et al. | 415/174 |
| 3,283,117 | 11/1966 | Holmes et al. | 117/105.2 X |
| 3,340,084 | 9/1967 | Eisenlohr | 117/105.2 X |

Primary Examiner—M. Cary Nelson
Assistant Examiner—David J. Zobkiw
Attorney—Herschel C. Omohundro and John N. Hazelwood

[57] ABSTRACT

This labyrinth seal has first and second relatively movable members with a rub-tolerant layer on one and spaced, continuous projections on the other. The projections have relatively thin edges initially disposed in closely spaced relation to the surface of the rub-tolerant layer, and when relative movement between the members takes place, some engagement of the edges with the rub-tolerant layer may take place. The layer is of a composition such that when the edges of the projections engage it during relative movement, some of the material will be compressed or moved to one or both sides of the projections to form grooves. The displaced material builds up at the sides of the grooves and increases their effective depth. The spacing of the projections exceeds the potential relative lateral movement between the members so that the resulting ribs at the sides of the grooves will not be destroyed. The resulting interfitting projection edges and grooves form a tortuous passage and reduce the flow of fluids between the members.

15 Claims, 6 Drawing Figures

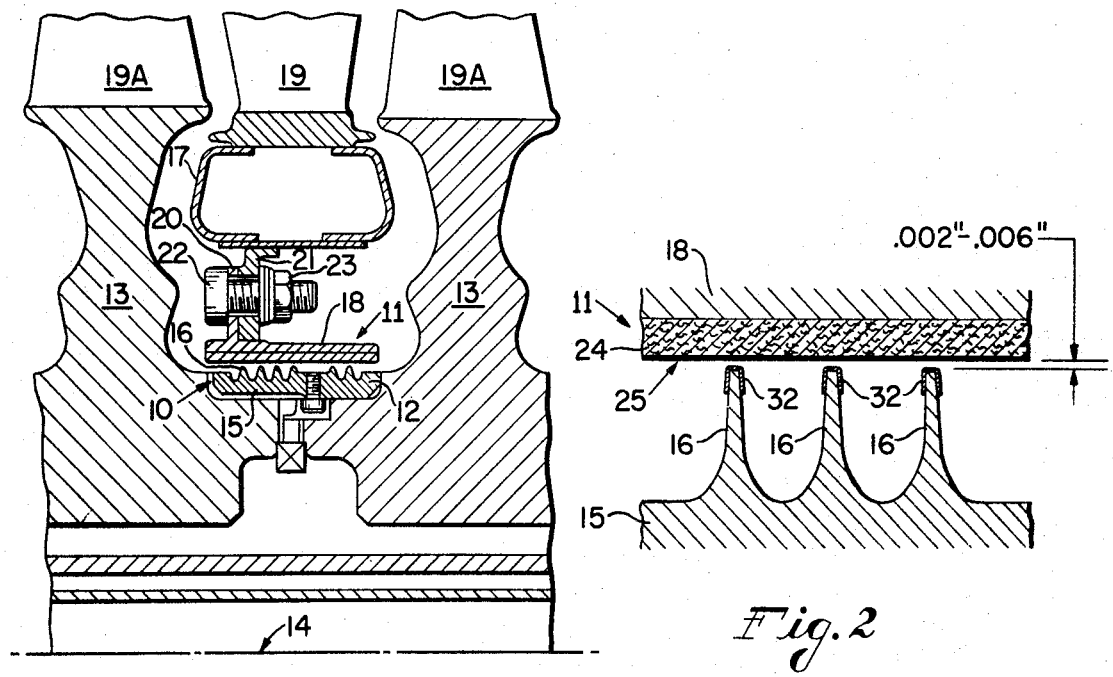
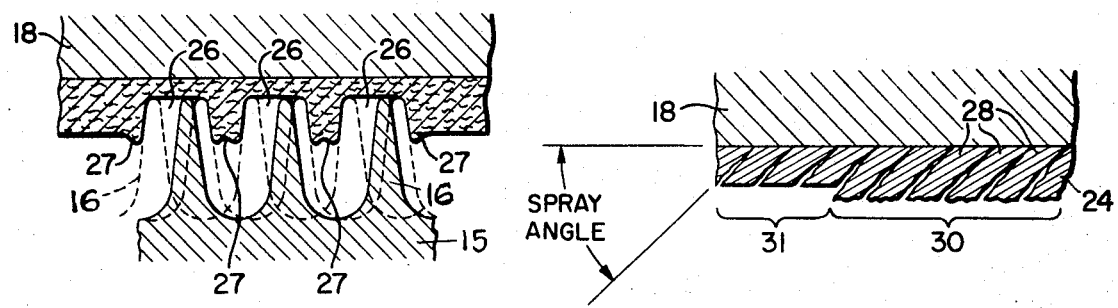
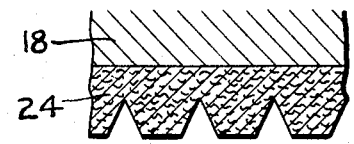
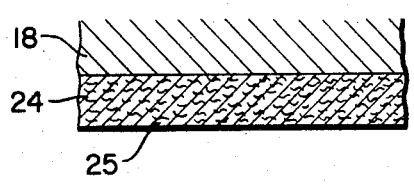
INVENTORS
JENNIFER V. MATTHEWS
THOMAS T. HAMRICK
BY
Herschel C. Omohundro
ATTORNEY

LABYRINTH SEAL

This application is a continuation of our application Ser. No. 689,574, filed Dec. 11, 1967, now abandoned.

This invention relates generally to seals of the type employed to prevent or control the flow of fluids, such as gases or liquids, between regions of different pressures. More particularly, the invention relates to seals for use between relatively movable machine components, such as shafts, and surrounding structure. Still more particularly, the invention relates to seals of the labyrinth type used in relatively high-temperature environments, such as are encountered in gas turbine rotor interstage locations and between the compressors and rotors of gas turbine engines. Such temperatures, in present engines, run as high as 1,800° F and in future engines may reach 2,400° F or more.

Seals for this purpose heretofore proposed have been unsuccessful for a number of reasons, one of which is that the material of the seal parts expanded and contracted under the influence of temperature change and friction to such an extent during use that parts initially sized for proper operation seized, wore rapidly, were distorted, fractured, melted, or otherwise failed to function and required premature removal and replacement. Also, some prior seals designed to avoid the above problems developed such excessive clearance during use that inefficiency of operation resulted. In some instances, also, it has been found that seals have caused "hang ups" to occur when subsequent starts are made within short time periods after shutdown. By "hang up" is meant a resistance to turning movement sufficient to prevent rotation of the engine. Such hang ups result from the shaft bowing enough to cause excessive engagement of seal parts when maximum convection cooling is effected. We have discovered that, by providing a seal with a layer of heat-resisting material which has been processed to make it malleable enough so that when used with complemental parts having predetermined construction it will be tolerant to rubbing. A seal satisfying all the requirements for use in high-temperature environments will thus be produced.

It is an object of this invention to provide a labyrinth seal which will avoid the objections to prior devices by restricting leakage between relatively movable parts to a practical minimum, have a prolonged life, and require no interim attention or service.

Another object of the invention is to provide a labyrinth seal which is composed of materials selected to improve the leakage-resisting characteristics of the device during use and to lengthen the period of useful life.

Still another object of the invention is to provide a labyrinth seal having relatively movable parts, one of which has a layer of high-temperature-resistant material, tolerant to rubbing, i.e., it will not become rough, abrade, wear away appreciably, or melt under normal operating conditions, but when subjected to impact over a restrictive area, will have a portion moved to either side of the point of force application to form a groove, the displaced material accumulating at the sides of the groove to increase its effective depth.

Still another object of the invention is to provide a labyrinth seal having relatively movable parts, one of which has a layer of material which is relatively porous and malleable so that when the component part of the seal engages the layer during use, the material of the layer at the location of engagement will cold-flow to the sides of the harder seal part and form a recess, the displaced material piling up at the sides and increasing the depth of the recess.

A further object of the invention is to form the layer of displaceable material mentioned in preceding objects from a sintered metallic fiber so that it will have the requisite porosity and malleability. Such material may be made by compressing and sintering fine steel or other suitable fibers by the method set forth in the article appearing on pages 126 to 128 of the Aug. 10, 1959 issue of the publication STEEL, or by method set forth in U.S. Pat. No. 3,127,668 to Troy, under which Huyck Metals Company is exclusive licensee and the manufacturer of a material found suitable in actual experience and sold under the trademark "FELTMETAL."

A still further object of the invention is to form the layer of displaceable material by flame-spraying a suitable metal onto a backing or support, aluminum, the melting point of which is approximately 1,200° F, nickel with a melting point 2,646° F, manganese, silver, and alloys containing such metals having been successfully employed.

Another object is to apply the metallic spray by tilting the spray gun at an acute angle, i.e., less than 90° and preferably between 15° and 45°, to the receiving surface so that the resulting layer will be porous and softer than solid metal, thus more readily displaceable, i.e., movable as contrasted to abradable, when engaged by the component seal number during engine operation.

Other objects and advantages will become apparent to those skilled in the art upon a perusal of the following description of one embodiment of the invention selected for illustration in detail in the accompanying drawings.

THE DRAWINGS

FIG. 1 is a fragmentary detail axial sectional view taken through a seal embodying the invention incorporated in a gas turbine engine between adjoining turbine stages;

FIG. 2 is a similar section of the seal only on an enlarged scale in the condition at assembly;

FIG. 3 is also a similar view on an enlarged scale showing the seal after the engine has been operated;

FIG. 4 is a detail sectional view of the layer of rub-tolerant material on a greatly magnified scale to show the porosity resulting from flame-spraying the coating.

FIG. 5 is a similar view of the rub-tolerant layer formed of sintered metallic fiber; and FIG. 6 is also a detail sectional view on a magnified scale of a modified seal construction.

DESCRIPTION

The principles of the seal embodying the present invention are suitable for use between any two relatively movable elements wherein it is desirable to preclude or limit fluid flow between the regions on opposite sides of the seal. As illustrated in FIG. 1 of the drawings, the seal is particularly useful in controlling fluid leakage between adjacent stages of a gas turbine engine. In such figure, the seal is generally designated by the numeral 10. It includes a stationary part 11 and a rotating part 12. The latter is mounted between adjacent disks 13 of the turbine wheel assembly supported for rotation about an axis 14. In the present illustration, the disks 13 are separately formed, but are secured to rotate together by curvic couplings (interengaging lugs) formed on the wheel hubs. The rotating part 12 of the seal comprises a sleeve element 15 which is pressed onto the hub of one of the wheels and projects over the curvic coupling.

Sleeve 15 is provided on the outer side with a plurality of spaced projections 16 which extend completely and continuously around the sleeve. These projections, ribs or rings, as they may be designated, are tapered or reduced in thickness at their outer edges to provide narrow lands, the widths depending upon the diameters of the seal as well as other parameters, such as, (a) radial clearance between movable and stationary seal parts, (b) spacing of sealing edges, (c) difference in pressure in regions separated by seal, and (d) number of sealing edges. In one typical application, the lands were approximately 0.010 inch wide and substantially 1.5 inch in diameter. This relation may or may not be critical, depending upon the particular installation, but should be such that the projections are of quite limited width for a purpose to be hereinafter set forth. It is important to note that the projections are spaced axially of the sleeve; this spacing is somewhat critical and the reason therefor will be set forth hereinafter.

By pressing the sleeve onto the hub of one of the wheels, it will be caused to rotate in unison with the wheel assembly. It may be found desirable in some instances to insure the unitary rotation of the sleeve and wheel by pinning the sleeve to the hub. One way this objective can be achieved is by inserting one or more headed pins into the sleeve from the inner side and forming recesses in the hub to receive the heads of the pins when the sleeve is pressed onto the hub.

FIG. 1 shows that the seal part 11 is mounted on a separator 17, which in turn is fixed to a part of the turbine casing or frame (not shown). The separator 17 extends from the casing into the space between adjacent wheel disks to confine fluid flow from one turbine stage to the next to a path constituting the regular gas passage containing inlet nozzle vanes 19 and wheel blades 19A. The seal of the present invention further confines gas flow to such path by controlling leakage around the wheel hubs between the turbine stages.

Seal part 11 has a supporting tube 18 with an external flange 20 secured to an internal flange 21 on the separator 17 by bolts and nuts 22,23. The tube 18 is substantially as long as the sleeve element 15 and is disposed about the same axis, i.e., the axis of rotation of the turbine rotor assembly. As illustrated in FIGS. 2, 3, 4, and 5, particularly, the tube 18 has an inner layer 24 formed therein. Since this layer, during engine operation, is exposed to the gases of combustion and possible rubbing engagement with ribs 16, it is composed of a heat-resisting, rub-tolerant material, i.e., a material which is, in effect, malleable and will not gall, tear, abrade, or ball up when engaged with a relatively movable element. The material, preferably, is displaceable when forcibly engaged over a restricted area. The word "displaceable", as used in the preceding sentence and elsewhere herein, means deformable, ductile, tractable, or malleable, the material being capable of moving to either side rather than being cut away when forcibly engaged by the radially projecting rings 16 during relative rotary movement of the seal parts.

As previously mentioned, the edges of the projections 16 are of quite limited width so that they may readily penetrate the layer 24 and spread the material toward either side thereof. Due to this characteristic, at least part of the material will cold-flow to the sides of the engaging instrumentality and form a depression, the sides of which are slightly higher because of the addition of the material from the depression. This feature is particularly shown in FIG. 3. It is augmented slightly due to relative axial movement between the turbine wheel assembly and casing during operation of the turbine, as indicated by dotted lines in this figure. While it would be highly desirable to have the rotating assembly of the engine so constructed, balanced, and mounted that it would turn precisely with no runout and no relative axial movement, it is obviously humanly impossible to secure such a result. The seal parts are, therefore, formed of selected material and designed so that upon initial installation in the turbine, the edges of the projections will be spaced from the inner surface 25 of the layer 24 a very slight distance, for example, from 0.002 to 0.006 inches. (See FIG. 2)

When the turbine is operated, the parts will be heated and some expansion will take place which may slightly reduce the clearance between the rotatable and stationary seal parts from that initially provided. The rotating assembly may also pass through critical vibration stages in which some interference or engagement between the seal parts occurs. At such times, the relatively narrow edges of the projections 16 may forcibly engage the surface 25 and displace some of the material of the layer. Since the material of the layer is softer than that of the projections, the deformation will occur on the stationary seal part and grooves 26 will be formed. As explained above, the displaced material flows to the sides of the projections and increases the height of the groove side walls. In the event relative axial movement between the rotor and casing occurs, more material at the groove sides will be displaced and piled up, as at 27 on the inner surface 25 of the layer 24. By spacing the projections 16 sufficiently in excess of the potential axial movement of the turbine rotating assembly, the ridges 27 between the grooves will be maintained. The buildup of such ridges resulting from the displaced material will increase the tortuousness of the path between the seal parts and improve the effectivity of the device.

As mentioned above and set forth in the objects, the layer 24 may be formed of a variety of materials which resist the heat of the combustion gases and fabricated by at least one of several particular processes to render it rub-tolerant. It has been found that a process which makes the material sufficiently porous to compress or move to either side of the engaging rib is desirable. The layer 24 may be suitably applied to the internal surface of the support tube 18, the preferred method being one from which the requisite porosity of the material will result. As shown in the highly magnified view of FIG. 4, metal may be flame-sprayed from one end of the support tube onto the inner surface of the tube 18 to build up the layer to the desired thickness. In so applying the coating, the spray gun is inclined at an acute spray angle from 15° to 45° to the surface of the tube, causing small wirelike projections 28 to bond to the surface. The projections 28 incline and are slightly spaced from one another, giving the coating the porosity desired. In some instances, the seal part can be used in the "as sprayed" condition indicated at 30. In other instances it may be found desirable to remove by machining away a slight portion of the coating, as at 31, if undue roughness of the surface results, or if the internal diameter of the stationary seal part should be undersize. In the latter case, only a small portion is removed so that the porosity of the layer is preserved.

FIG. 5 shows a form of rub-tolerant layer 24 when the porous material is first manufactured in sheet form and then brazed, welded, or otherwise attached to the tubular carrier 18. In this figure, the layer 24 is composed of metallic fibers suitably formed, assembled, pressed to the desired thickness, and sintered to make the fibers fuse to one another. This material is then cut to size and attached to the support. Any method of fabricating the layer 24 may be employed so long as the material may be displaced by the projecting ribs 16 during engine operation to form the alternate ridges 27 and grooves 26.

It will be obvious that the figures in the drawing are magnified to make the construction more readily discernable and that the edges of the ribs or rings 16 are actually relatively thin; therefore, it is within the realm of the invention to provide the edges thereof with a thin coating 32 of a harder protective material. This coating may be applied in any suitable manner, such as flame-spraying. Such coating will be limited to the portions of the ribs or rings adjacent the thin outer edges, as shown in FIG. 2.

It may be found desirable in some instances to reduce the density of the rub-tolerant layer by machining spaced grooves therein, as shown in FIG. 6, prior to assembly in the engine. These grooves will be spaced the same as the ribs and will serve to decrease the potential area of initial contact of the edges of the ribs or lands of the movable member with the layer, thus reducing possible friction during startup or use. It will also facilitate the deformation of the rub-tolerant layer when the edges engage the same during runout or critical vibration of the engine rotor assembly.

What is claimed is:

1. A labyrinth seal between two relatively rotatable members which are normally concentrically disposed but potentially capable of limited eccentric and axial relative movement during at least one critical stage of operation, comprising:
   a. a malleable layer on the first of said members, said layer being of a thickness exceeding the potential eccentric relation of said members and composed of a ductile metal having a melting point exceeding 1,200° F and having a porosity which facilitates movement of some of the metal to either side when subjected to the application of force over a limited area; and
   b. a plurality of spaced, continuous projections on the second of said members, each of said projections having a relatively thin edge initially spaced between 0.002 and 0.006 inches from said malleable layer and serving, when engaged therewith during such critical stage of operation, to laterally displace a portion of said material and form a groove with the displaced material accumulated at at least one side thereof.

2. A labyrinth seal as set forth in claim 1 in which the spacing of the projections on the second member exceeds the possible relative axial movement between said members whereby a definite ridge between adjacent grooves formed in said first member by relative eccentric rotation will be maintained.

3. A labyrinth seal as set forth in claim 1 in which the malleable layer is composed of a sintered metallic fiber.

4. The labyrinth seal as set forth in claim 3 in which the sintered metallic fiber layer is composed of previously fabricated sheet material attached to the first of said members.

5. A labyrinth seal as set forth in claim 1 in which the malleable layer is composed of sintered metallic fiber identified commercially as FELTMETAL.

6. A labyrinth seal as set forth in claim 1 in which each continuous projection has an edge width to diameter ratio of substantially 0.010 to 1.5.

7. A labyrinth seal as set forth in claim 1 in which the malleable layer is composed of groups of particles of the metal projecting at a predetermined angle and in spaced relation from one another to yield a selected porosity.

8. A labyrinth seal as set forth in claim 7 in which said predetermined angle is between 15° and 45° relative to the surface of the first member.

9. A labyrinth seal as set forth in claim 1 in which the malleable layer is composed of a material containing aluminum.

10. A labyrinth seal as set forth in claim 1 in which the malleable layer is composed of a material containing aluminum and nickel.

11. A labyrinth seal as set forth in claim 1 in which the malleable layer is composed of a material containing silver.

12. A labyrinth seal as set forth in claim 1 in which the malleable layer is composed of a material containing silver and manganese.

13. In a seal between two relatively rotatable members which are normally disposed between 0.002 and 0.006 inches spaced concentric relationship but potentially capable of limited eccentric relation during at least one critical stage of operation, a part comprising:
   a. a tubular support with an internal surface; and
   b. a layer of rub-tolerant porous material affixed to said internal surface of the support, said layer being of a thickness exceeding the potential eccentric relation of said members and composed of a malleable metal with a melting point exceeding 1,200° F and having the characteristic of being deformable when subjected to the application of localized force and secured to the support such that groups of particles of the metal project at an angle from the internal surface toward one end of the support in spaced relation to yield a predetermined porosity such as to facilitate the movement of some of the metal to either side when subjected to the application of force over a limited area.

14. The seal part as set forth in claim 13 in which the layer of rub-tolerant porous material is initially provided with grooves disposed in predetermined spaced relation.

15. The seal part as set forth in claim 13 in which the rub-tolerant layer is lightly machined to provide the part with a predetermined inner diameter and maintain said predetermined porosity.

* * * * *

UNITED STATES PATENT OFFICE
CERTIFICATE OF CORRECTION

Patent No. 3,701,536      Dated  October 31, 1972

Inventor(s) Jennifer V. Matthews and Thomas T. Hamrick

It is certified that error appears in the above-identified patent and that said Letters Patent are hereby corrected as shown below:

CHANGE -

[73] Assignee: The Garret Corporation, Los Angeles, Calif.

to

[73] Assignee: The Garrett Corporation, Los Angeles, Calif.

Signed and sealed this 15th day of May 1973.

(SEAL)
Attest:

EDWARD M. FLETCHER, JR.          ROBERT GOTTSCHALK
Attesting Officer                Commissioner of Patents